United States Patent [19]
Payne et al.

[11] 4,295,776
[45] Oct. 20, 1981

[54] PORTABLE INVERTER FOR TRANSFERRING BULK GOODS BETWEEN PALLETS

[76] Inventors: Alan Payne, Poplar Lodge, Beeston, Kings Lynn, Norfolk; Robin G. Bunning, Willow House, Gressenhall, East Dereham, Norfolk, both of England

[21] Appl. No.: 179,869

[22] Filed: Aug. 20, 1980

Related U.S. Application Data

[63] Continuation of Ser. No. 945,278, Sep. 25, 1978, abandoned.

[51] Int. Cl.³ .............................................. B65G 7/00
[52] U.S. Cl. .................................. 414/405; 414/421; 414/766; 414/771
[58] Field of Search ............... 414/405, 419, 420, 421, 414/754, 763–767, 771, 783

[56] References Cited

U.S. PATENT DOCUMENTS

| | | | |
|---|---|---|---|
| 2,001,008 | 5/1935 | Aubrey | 414/421 |
| 2,803,363 | 8/1957 | Hutchinson | 414/608 |
| 2,865,517 | 12/1958 | Alford | 414/766 |
| 3,123,232 | 3/1964 | Postlewaite | 414/907 X |
| 3,190,461 | 6/1965 | Postlewaite | 414/766 X |
| 3,259,992 | 7/1966 | Bonwit et al. | 414/783 X |
| 3,497,082 | 2/1970 | Flitter | 414/766 |
| 3,738,519 | 6/1973 | Edwards | 414/771 X |
| 3,895,722 | 7/1975 | Pluntz | 414/766 |

*Primary Examiner*—Leslie J. Paperner
*Attorney, Agent, or Firm*—Pollock, Vande Sande and Priddy

[57] ABSTRACT

A portable inverter, adapted to be moved to a desired location by a fork lift truck, enables bulk goods packed in sacks, boxes and the like and supported on a first pallet to be transferred to a second pallet. The inverter comprises a unitary three-sided, rotatably supported platform, the three sides of which are reinforced by intersecting ribs, which receives bulk goods stacked onto the first pallet, and includes a sheet metal floor onto which the pallet can be placed, a sheet metal side wall for retaining bulk goods resting against it, and a sheet metal rear wall which is longer than the side wall so that the first pallet can be loaded widthwise onto the load platform from the front thereof. A lid is slideably supported on the rear wall of the load platform in spaced parallel relationship to the floor for movement, by means of a hydraulic ram actuator, towards and away from the floor. The lid is adapted to support the base of a second pallet which is placed in the load platform with its load-accepting surface resting on top of the stack of goods. After the two pallets and the intervening bulk goods are loaded into the load platform, the lid is retracted to engage the base of the second pallet, the load platform is then rotated from an initial upright position to an inverted position, the direction of rotation being such that the side wall supports the load during the inversion, and the lid is then moved downwardly to release the load.

4 Claims, 2 Drawing Figures

PORTABLE INVERTER FOR TRANSFERRING BULK GOODS BETWEEN PALLETS

This is a continuation of application Ser. No. 945,278, filed Sept. 25, 1978, abandoned.

FIELD OF THE INVENTION

The present invention relates to a load transfer device for transferring bulk goods packed in sacks, boxes or the like from one pellet to another.

BACKGROUND OF THE INVENTION

It is known to stack sacks or boxes or the like containing bulk goods onto a pallet which may be engaged by the forks of a fork lift truck for movement from one place to another or for loading into a goods vehicle. A pallelized load is commonly stacked into a goods vehicle and then conveyed by road to a distribution point from which the goods are distributed to customers. The customer may accept the load stacked on the manufacturer's or distributor's pallets but the customer may fail to return the pallets to the distribution point. The customer may have pallets of his own which may become mixed up with the pallets belonging to the manufacturer or distributor. Hitherto no machine of which the applicants are aware has been available which can transfer goods from one pallet to another and such transfer has been carried out by hand which is a time-consuming and expensive operation.

The problems associated with the use of timber pallets in the U.K. transport industry are the subject of a study commissioned by the Committee for Materials Handling Department of Industry and published under the title "Materials Handling pallet usage and wastage" by Her Majesty's Stationery Office, London, 1977.

An object of the invention is to provide a simple and inexpensive machine for transferring a palletized load from one pallet to another so that a distributor can rapidly offload bulk goods from his own pallets onto the customer's pallets.

SUMMARY OF THE INVENTION

The present invention provides a load transfer device for transferring bulk goods packed in sacks, boxes and the like from a first pallet on which they are supported to a second pallet, said device comprising in combination:

a load platform adapted to receive bulk goods stacked onto the first pallet and comprising a floor onto which the pallet can be placed, and a side member for retaining bulk goods resting against it;

a lid slidably supported on the load platform in spaced parallel relationship to the floor for movement normal to the floor, the lid being adapted to support the base of a second pallet placed in the load platform with its load accepting surface resting on the top of the stack of goods;

actuating means connected between the load platform and the lid and adapted to extend the lid away from the floor to allow the first and second pallets to be loaded into the load platform and to retract the lid towards the floor to engage the base of the second pallet; and means for rotating the load platform between an upright position and an inverted position, the direction of rotation being such that the side member supports the load during the inversion.

DESCRIPTION OF THE DRAWINGS

An embodiment of the invention is described below, by way of example only, with reference to the accompanying drawings, in which.

DESCRIPTION OF THE PREFERRED EMBODIMENTS

Figure 1:
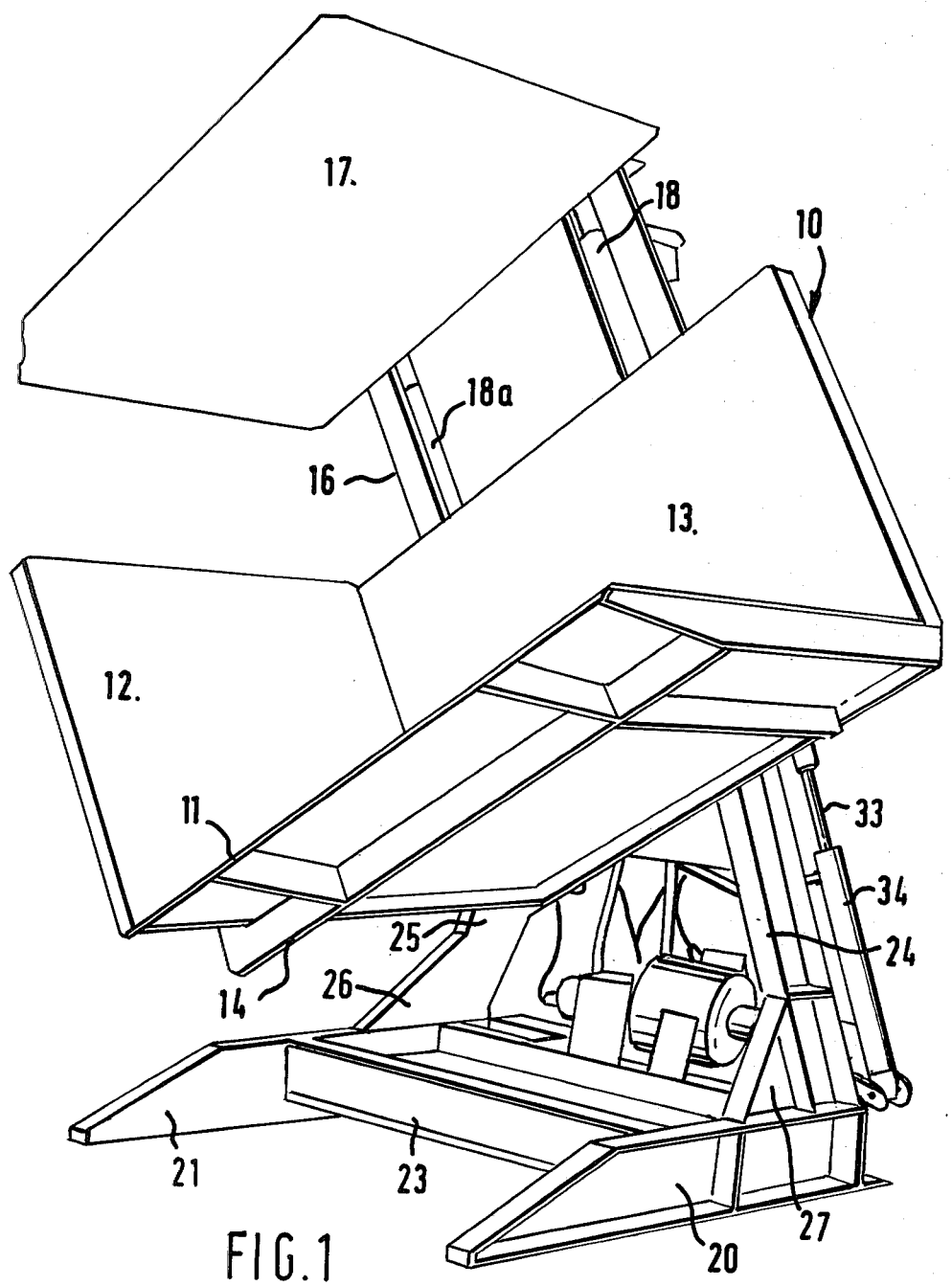
FIG. 1 is a perspective view from the front of a load transfer device.
Figure 2:
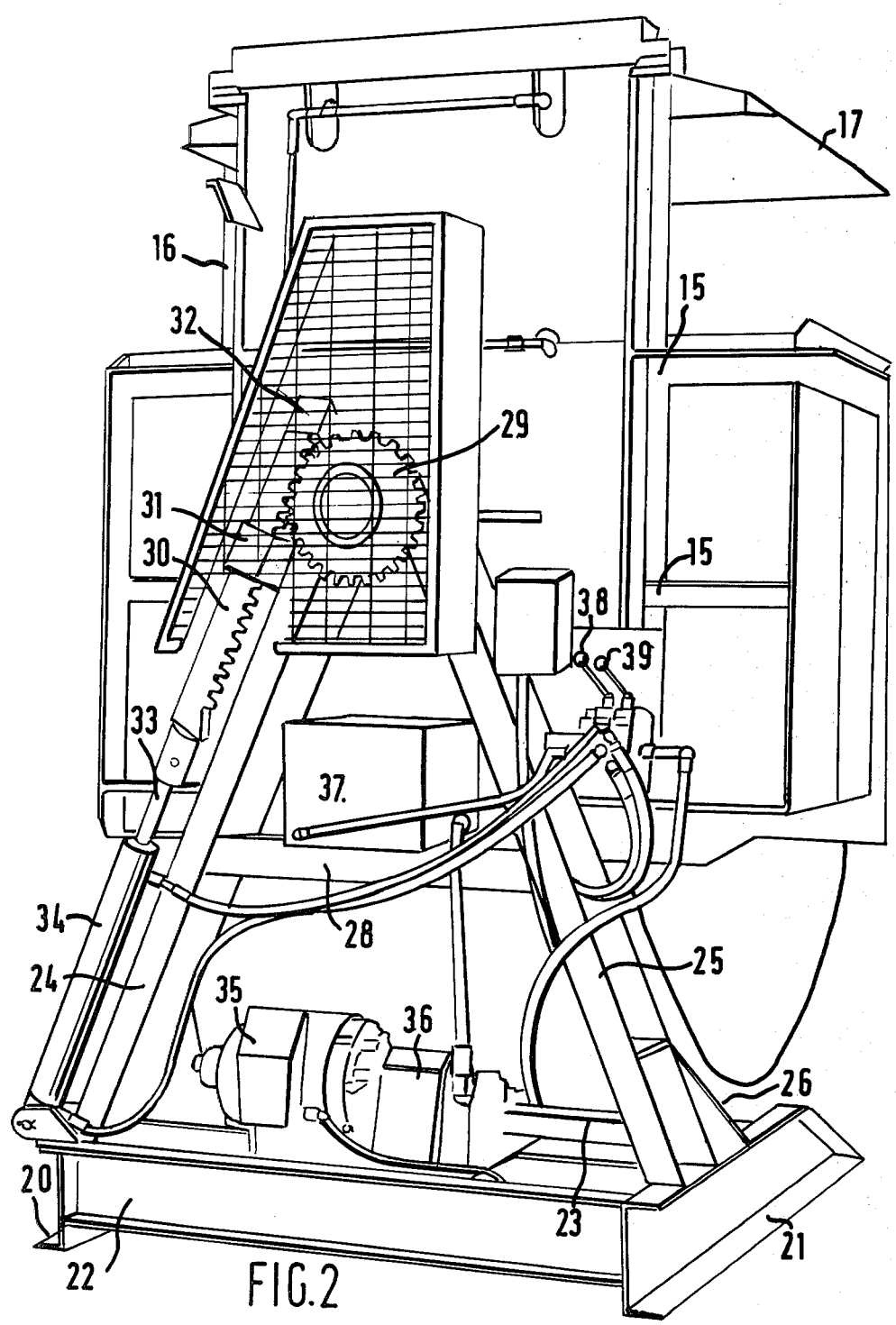
FIG. 2 is a rear perspective view of the load transfer device shown in FIG. 1.

A load platform generally indicated by the reference numeral 10 comprises a floor 11, a side wall 12 and a rear wall 13 each made of sheet steel and welded together at their adjacent edges. The floor 11 is dimensioned to accept standard size pellets which in the U.K. are normally of sizes up to 5' by 4' and the other floor is strengthened by means of longitudinal and transverse reinforcing ribs 14 welded thereto to impart rigidity and enable the floor to support a loaded pallet. The side wall 12 and rear wall 13 are also similarly reinforced. The rear wall reinforcing ribs 15 terminate in cut-outs defining a slideway directed parallel to the rear wall at right angles to the floor and a sliding member 16 in the slideway engages the cut-outs and slidably supports a lid 17 projecting therefrom in spaced parallel relationship to the floor 11. The lid 17 is also reinforced with intersecting ribs welded thereto on its outer face so as to be capable of supporting a loaded pallet weighing typically up to 2 tons. The sliding member 16 houses a pair of hydraulic rams 18 and 18a. The hydraulic rams are mounted parallel to one another and each has one end fastened to the sliding member 16 adjacent the line where the lid 17 joins the sliding member 16 and has its other end fastened to the load platform 10 adjacent the line where the floor 11 joins the rear wall 13. Extension or retraction of the hydraulic rams 18 and 18a extends the lid 17 away from the floor 11 or retracts the lid 17 towards the floor 11.

The load platform is supported on a free-standing base comprising channel section side members 20 and 21 and rolled steel cross members 22 and 23. The bottom flanges of the cross members 22, 23 are positioned above the bottom flanges of the side members 22, 23 so that the forks of a fork lift truck can engage the cross members for moving the load transfer device from place to place. Extending upwardly from the side members 20 and 21 are frame members 24 and 25 which converge at their top end to support a bush (not shown). Gussets 26, 27 are welded between the frame members and the side members, and a horizontal reinforcing member 28 is welded between the frame members 24 and 25 at an intermediate point. A pivot shaft (not shown) is rigidly secured to the rear wall 13 of the load platform behind the sliding member 16 and extends through the bush at the top end of the frame members 24 and 25 and terminates in a pinion 29 rigidly secured thereto. A rack 30 directed parallel to the longitudinal direction of the frame member 24 is slidably supported in spaced guides 31 and 32 and is attached at its lower end to a pushrod 33 of a hydraulic ram 34 aligned with the rack. Extension or retraction of the pushrod is transmitted via the rack 30 and pinion 29 to rotate the load platform 10 and lid 17. Limit members (not shown) are provided to define the upright and inverted positions of the load platform and to limit the travel of the load platform.

On the base is mounted a 3 h.p. electric motor 35 whose output shaft is connected to a Dowty 3020 hydraulic pump 36 for hydraulic fluid which pump is connected to a reservoir 37 for the hydraulic fluid. A first pair of extension and retraction hydraulic lines extends from a first control valve 38 to the hydraulic ram 34. A second pair of extension and retraction hydraulic lines extends from a second control valve 39 to the hydraulic rams 18, 18a.

In operation the motor 35 is switched on and the first control valve 38 is operated to cause the ram 34 to effect rotation of the load platform 10 to the upright position. The second control valve 39 is then operated to cause the rams 18 and 18a to extend the lid 17 away from the floor 11 of the load platform. A load of bulk goods stacked on a manufacturer's or distributor's pallet may be brought on a fork lift truck or other suitable conveyor from a store or from a van or lorry as the case may be and loaded onto the load platform. A customer's pallet is then placed onto the top of the load of bulk goods with its load accepting surface directed downwardly. The second control valve 39 is then operated to lower the lid 17 until it engages the base of the customer's pallet, after which the first control valve 38 is operated to cause the ram 34 to rotate the load platform 10 to the inverted position. The direction of rotation is such that the side wall 12 moves downwardly and supports the load against side thrust while the load platform is moving to the inverted position. The second control valve 39 is then operated to extend or lower the lid 17 which now supports the stack of bulk goods. The manufacturer's or distributor's pallet is removed, the goods are unloaded from the load platform on the customer's own pallet and conveyed to his lorry after which the lid 17 is retracted away from the floor 11 and the load platform is returned to the upright position to receive the next pallet.

Various modifications can be made to the embodiment described herein without departing from the invention. Although hydraulic operation has been found to be the most convenient for the present purpose, the load platform and lid could be mechanically actuated, for example by means of nuts travelling on lead screws. The sliding member could be positioned on the side wall rather than the rear wall. Instead of being free-standing, the load platform with its associated actuating and control mechanism could be supported on a bracket fixed to a column or stanchion of a factory or warehouse or to a wall thereof.

We claim:
1. A free-standing, portable palletized load inverter for transferring bulk goods, packed in a plurality of sacks, boxes and the like and supported on a first generally rectangular pallet, to a second similar pallet, said palletized load inverter comprising:
- a unitary, three-sided load platform of sheet metal adapted to be selectively rotated as a unit between an upright attitude and an inverted attitude, said load platform when in its said upright attitude being adapted to receive and support bulk goods stacked onto the first pallet, said load platform including a sheet metal floor constituting one side of said three-sided platform onto which the first pallet can be placed, a sheet metal side wall constituting a second side of said three-sided platform for retaining the stacked bulk goods resting against it, said sheet metal side wall being disposed at substantially right angles to said floor and being located in abutment with one end edge of said floor, and a sheet metal rear wall constituting the third side of said platform and disposed at substantially right angles to said floor and side wall, said rear wall having edges which are in abutment with edges of said floor and side wall and having a length corresponding to that of said floor and a height corresponding to that of said side wall, and said sheet metal floor, side wall and rear wall being fixedly attached to one another at their abutting edges respectively in a unitary configuration which defines a three-sided load receiving region and which is rotatable as a unit between said upright and inverted attitudes, said rear wall being longer than said side wall so that the first pallet can be loaded widthwise onto the load platform from the front thereof;
- a plurality of intersecting horizontal and transverse reinforcing ribs attached to said floor, to said side wall, and to said rear wall on the faces thereof which are remote from said three-sided load receiving region, at least some of said ribs extending across said faces at positions thereon inward of the boundary edges of said faces;
- means defining a slideway on said rear wall directed parallel to the rear wall at right angles to said floor;
- a sliding member in said slideway which slideably supports a sheet metal lid projecting therefrom in overlying relation to said three-sided load receiving region and in spaced parallel relationship to said sheet metal floor for rotation as a unit with said load platform and for movement along a line normal to the plane of said floor, said lid also having intersecting reinforcing ribs attached to the face thereof remote from said load receiving region, said lid being adapted in the said inverted attitude of the load platform to support the second pallet which had previously been placed in said load platform, when said load platform was in its said upright attitude, with the load accepting surface of the second pallet resting on the top of the said bulk goods;
- hydraulic ram actuating means connected directly between said load platform and said lid and operative to selectively extend said lid away from said floor while said load platform is in its said upright attitude to allow the first and second pallets to be loaded into said load platform, and said actuating means also being operative selectively to retract said lid towards said floor to engage the base of the second pallet after the first and second pallets and the said bulk goods therebetween have been loaded into said load platform;
- a stand having a rotatable shaft mounted thereon and affixed to said sheet metal rear wall for supporting the load platform rotatably above ground level, said stand including a ground-contacting base which extends underneath the load platform to provide stable support therefor and an upstanding support frame for the load platform, said ground-contacting base having at least one structural portion thereof location above ground level and adapted to receive the forks of a fork lift truck in lifting engagement therewith for moving said load transfer device from one location to another; and
- means in driving engagement with said rotatable shaft for selectively rotating said load platform between its said upright attitude and its said inverted atti- tude, the direction of rotation being such that said rib reinforced side wall supports said bulk goods during the rotation of said load platform from its said upright attitude into its said inverted attitude.

2. The load inverter of claim 1 wherein said stand and support frame includes first and second side members underlying the load platform to either side thereof, cross members rigidly secured between the side members, an upwardly convergent A-frame secured at its lower end to said first and second side members, and a bearing rigidly secured to the top end of said A-frame within which said rotatable shaft is pivotally received.

3. The load inverter of claim 2, wherein the lower edges of said cross members are positioned above the lower edges of said side members to provide the said structural portion of said ground-contacting base, the positions of the cross members being such that the forks of the fork lift truck may be inserted beneath said cross members into lifting engagement therewith.

4. The load inverter of claim 2 wherein said means in driving engagement with said rotatable shaft for selectively rotating said load platform comprises a double-acting hydraulic ram secured along one side of said A-frame with its direction of action approximately parallel to said one side, said double-acting hydraulic ram having a pushrod, a rack secured to said pushrod, and a pinion secured to said shaft for rotation therewith, said pinion being in meshing engagement with said rack, whereby extension or retraction of said pushrod effects rotation of said load platform between its said upright and inverted attitudes.

* * * * *